United States Patent [19]
Fowler et al.

[11] 3,951,549
[45] Apr. 20, 1976

[54] TRANSMITTER-RECEIVER SYSTEM

[75] Inventors: Richard L. Fowler, Royal Oak; Gary I. Robin, Oak Park, both of Mich.

[73] Assignee: The United States of America as represented by the Secretary of the Interior, Washington, D.C.

[22] Filed: Aug. 20, 1974

[21] Appl. No.: 499,103

[52] U.S. Cl. .............................. 356/5; 250/552; 307/246; 356/4
[51] Int. Cl.² ..................... G01C 3/08; H03K 17/56
[58] Field of Search .............. 356/4, 5, 28; 307/246; 250/552

[56] References Cited
UNITED STATES PATENTS

| | | | |
|---|---|---|---|
| 3,545,861 | 12/1970 | Farnsworth et al. | 356/5 |
| 3,606,537 | 9/1971 | Yurasek et al. | 356/5 |
| 3,648,073 | 3/1972 | Sams et al. | 307/246 |
| 3,650,628 | 3/1972 | Tawfik et al. | 356/5 |
| 3,661,459 | 5/1972 | Aoki | 356/4 |
| 3,666,367 | 5/1972 | Farnsworth et al. | 356/5 |
| 3,743,419 | 7/1973 | Skagerlund | 356/5 |
| 3,853,402 | 12/1974 | Nichols | 356/5 |

*Primary Examiner*—T. H. Tubbesing
*Assistant Examiner*—S. C. Buczinski
*Attorney, Agent, or Firm*—Gersten Sadowsky; Donald R. Fraser

[57] ABSTRACT

An optical transmitter-receiver system is provided which is particularly adapted for use in vehicle guidance, obstacle detection and the like. The system includes a laser diode transmitter including a modulation circuit comprising a bank of transistors that are individually triggered into the avalanche mode so that energy stored by a capacitive storage network is discharged into the diode. In accordance with a first receiver embodiment, which includes a range flip-flop controlled by a threshold comparator, an analog voltage proportional to range is produced. In a second receiver embodiment, the receiver responds to targets within a prescribed zone determined by an analog gated amplifier.

7 Claims, 4 Drawing Figures

TRANSMITTER-RECEIVER SYSTEM

FIELD OF THE INVENTION

The present invention related to optical radar systems and, more particularly, to optical radar systems which are suitable for use in guidance and obstacle detection.

BACKGROUND OF THE INVENTION

In present practice, guidance and obstacle detection for shuttle cars and like vehicles are generally provided by the operator himself through simple visual observation. Electronic detection systems can also be used for this purpose. Systems presently available suffer a number of disadvantages, partly because of the unique demands of shuttle car guidance and obstacle detecting. Examples of optical radar systems which are comparable to that of the present invention are disclosed in U.S. Pat. Nos. 3,341,708,; 3,402,630 and 3,545,561, although this listing is not, nor is it represented to be, exhaustive.

SUMMARY OF THE INVENTION

In accordance with the invention, a narrow-pulse, short range optical radar system is provided which provides substantial advantages as compared with conventional radar systems for particular applications. One application of substantial importance is in shuttle car guidance and obstacle sensing although the system of the invention is useful for any non-contacting sensing or detecting purpose within the range and accuracy limitations thereof.

The radar system of the invention includes an improved laser diode transmitter including a short-pulse modulation circuit which enables pulse modulating the laser diode with short, high peak current pulses having fast rise and fall times. The modulation circuit includes a bank of transistors which are individually triggered into the avalanche mode so that energy stored by a capacitive storage network is delivered to the diode.

In a first embodiment of the receiver end of the system according to the invention, a ranging receiver is provided which determines the distance to objects or targets and produces an analog voltage output proportional to range. The receiver includes a video amplifier connected in an automatic gain control loop so as to ensure that comparisons with a threshold level made by a video amplifier connected in an automatic gain control loop so as to ensure that comparisons with a threshold level made by a video comparator consistently occur at the same leading edge point of the signal pulse. A range flip-flop is reset by the output of the video comparator when the magnitude of the input or received pulse is greater than the threshold level, the flip-flop being previously set by a synch pulse from the laser transmitter. The output of the flip-flop is a train of pulses the duration of which are porportional to the "round trip" propogation time between the transmitter, target and receiver. A duty cycle detector converts the output of the flip-flop into a D.C. analog voltage proportional to range. If a pulse of sufficient strength is not received, the flip-flop is reset by a clock pulse derived from a delayed sample of the synch pulse, the delay time determining the maximum range of the system. A "target present" signal is also provided using a second flip-flop.

In accordance with an alternate embodiment, a zone detecting receiver is provided which responds to targets located within a predetermined range corridor or zone established by a suitable timing gate, preferably in the form of an analog gated amplifier. The open time of the gate is controlled by a gate generator triggered by transmitter synch pulses, thereby determining the size of the range cell or zone.

Other features and advantages of the optical radar system of the invention will be set forth in, or apparent from, the detailed discription of the preferred embodiments thereof found hereinbelow.

BRIEF DESCRIPTION OF THE DRAWINGS

FIG. 1A is a fragmentary view of a portion of the block form diagram of FIG. 1;

DESCRIPTION OF THE PREFERRED EMBODIMENTS

As mentioned hereinabove, the transmitter-receiver of the present invention is particularly adapted for use in shuttle car guidance and obstacle sensing, although, as pointed out, the system can be used in many other applications. In general, in guidance and obstacle sensing applications, the transmitter produces an optical output signal which is preferably in the infrared range and is used to monitor the area to be traversed. The receiver receives the signal and converts the same into a corresponding electrical signal which, as mentioned above and is explained in more detail hereinafter, can be a measure of the distance to an obstacle or target within the area in question or an indication of whether an obstacle or target lies within a particular zone or corridor within that area.

Figure 1:
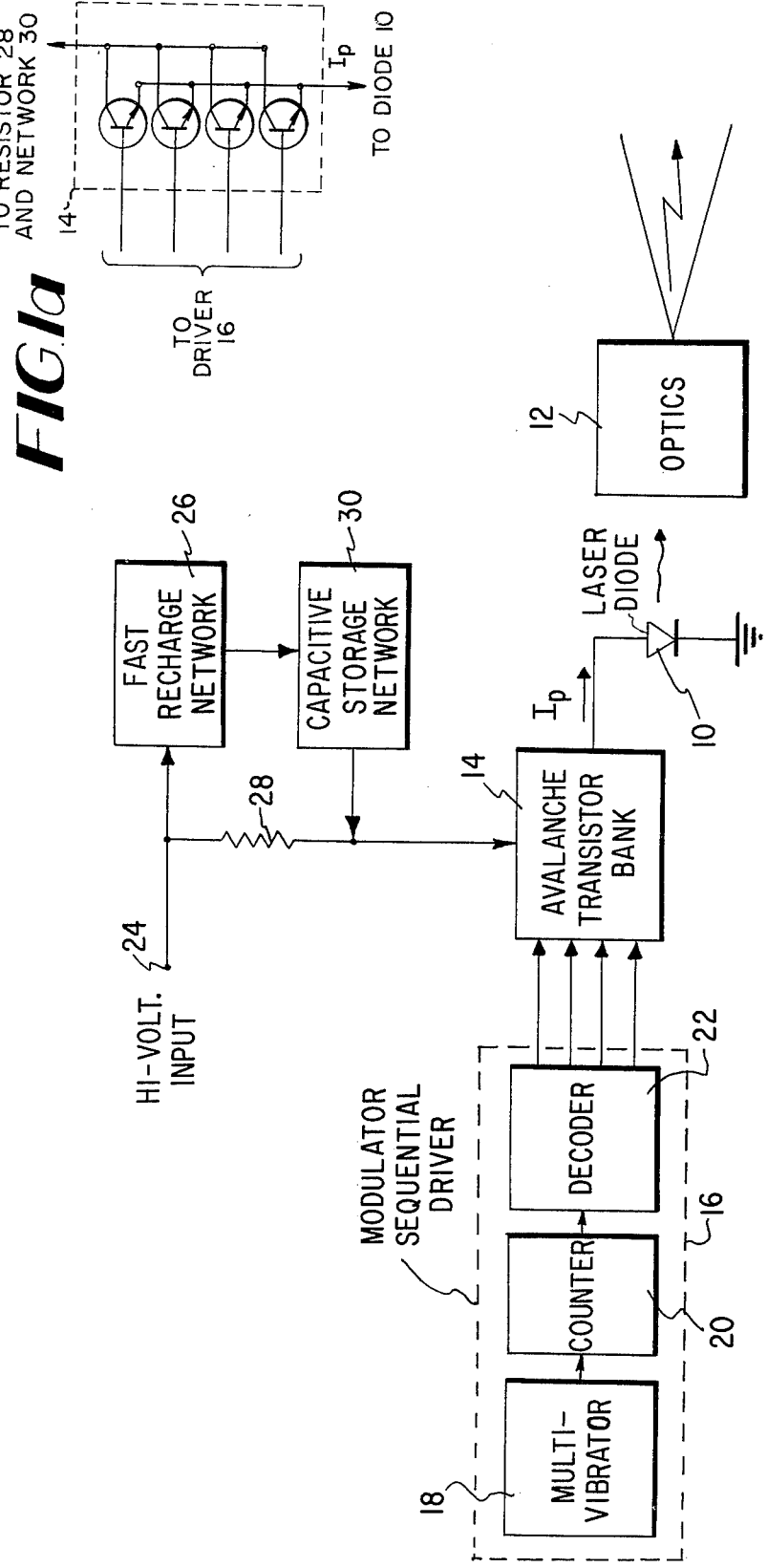
FIG. 1 is a block form circuit diagram of a transmitter in accordance with a preferred embodiment of the invention.

Referring to FIG. 1, a block form circuit diagram of the short pulse optical transmitter of the invention is shown. The transmitter includes an injection laser diode 10 the output of which, after suitable processing provided by conventional optics represented by block 12, forms the transmitter output. The laser 10, and associated optics 12, are, of course, common to many optical transmitters. As mentioned hereinabove laser diodes such as diode 10 have modulating requirements that typically call for high peak current pulses with fast rise and fall times to avoid the excessive heat which would otherwise be generated during the dwell periods below the diode lasing threshold. The transmitter circuitry described below produces such pulses.

In general, pulsing of laser diode 10 is provided by a bank of parallel connected avalanche transistors represented by block 14, four such transistors being utilized in the specific embodiment being considered. Transistor bank 14 is driven by a modulator sequential driver 16 which preferably comprises a 40kHz multivibrator 18, a binary counter 20 driven thereby, and a decoder 22 which converts the output of the counter 20 into sequential trigger signals. The output of decoder 22 triggers the avalanche transistors of bank 14 in sequence. The maximum pulse repetition frequency (prf)

is normally constrained by the avalanche transistor power dissipation limit rather than by duty factor limitations of the laser diode 10. By sequentially triggering the multiple, parallel connected avalanche transistors as described, the pulse repetition frequency can be increased up to the duty factor limit of laser diode 10.

A further input to transistor bank 14 is provided by circuitry including a high voltage input terminal 24, a fast recharge network 26, and a resistor 28, both connected to input 24, and a capacitive storage network 30 connected to the output of recharge network 26 across resistor 28, as illustrated. The individual transistors of transitor bank 14, when triggered into the avalanche mode thereof, dump energy stored in capacitive storage network 30 into the diode 10. The impedance of the transistors is low during the avalanche period and by maintaining a low impedance external discharge path as shown, a high current, short duration pulse is provided. The fast recharge network 26 is employed to provide a low resistance charging path for the storage capacitors of storage network 30 after the individual avalanche transistors have fired and preferably includes a transistor (not shown) which is turned on after a high current pulse to recharge the aforementioned capacitors. A diode (not shown) connected in the discharge path by-passes the base-emitter junction of the transistor.

In the specific example under consideration, the laser diode 10 is pulse modulated with 20-ampere peak pulses of 15 nanoseconds duration and at a 20kHz repetition rate. With the provision of moderate heat sinking, a pulse repetition rate of approximately 5 kHz can be accomodated by a T0–18 size transistors without excessive heat dissipation. With capacitive storage network 30 providing a 4000 pf storage capacitance and with an impressed voltage of 140 volts, the stored energy is $w=\frac{1}{2}CV^2=40$ microjoules. This corresponds to a peak pulse power of 2.7 kw over a 15 nanosecond pulse period. At the stated p.r.f. of 5 kHz, the average available power equals the product of peak power and a $75 \times 10^{-6}$ duty factor, or 0.2 watts, which is compatible with case size of the T0–18 transistors referred to above. The particular transistors chosen for avalanche transistor bank 14 are stock 2N2222 types. The multivibrator 18, counter 20 and decoder 22 comprises 9602, 7493 and 7442 types in the specific embodiment being considered. Although the physical layout of the modulator driver network 16 is not critical, the curcuit components in the avalanche discharge path should be configured so as to provide very low impedance and minimum inductance. A ribbon-conductor layout on a printed circuit board is preferably used for this purpose.

Figure 2:
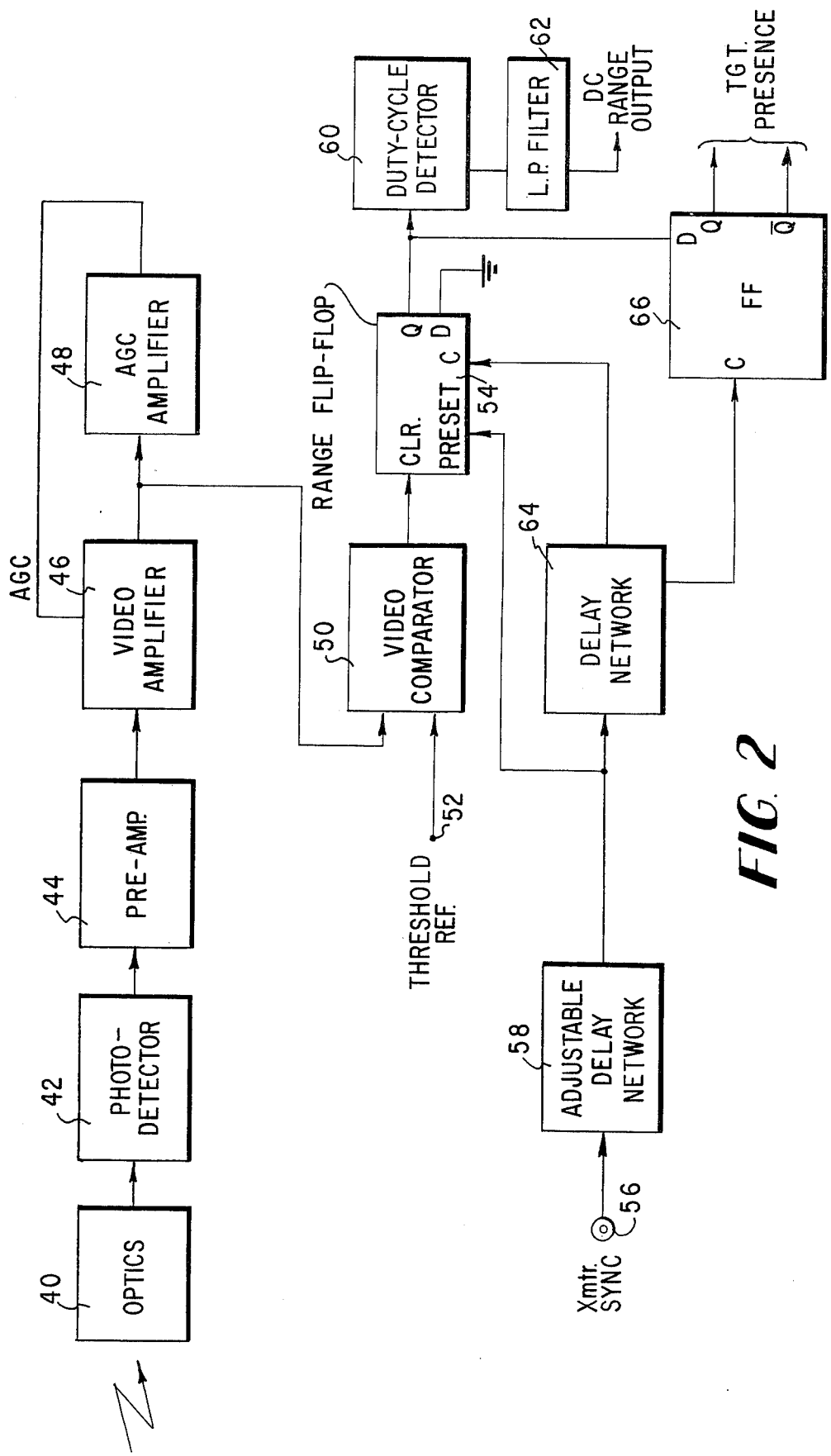
FIG. 2 is a block form circuit diagram of a range detecting receiver in accordance with one preferred embodiment of the invention.

Referring to FIG. 2, there is illustrated a first embodiment of a ranging receiver in accordance with the invention. In general, this receiver measures the distance to objects and produces an analog voltage output which is proportional to range.

As shown in FIG. 2, the receiver includes a suitable optics represented by block 40, which focus the incoming infrared reflected signal pulse onto a photo-detector 42 which preferably comprises a fast Schottky barrier photodiode. The photocurrent output of detector 42 is preamplified in a low noise current pre-amplifier 44.

Further video amplification is provided by a video amplifier 46 which is connected in an automatic gain control (AGC) loop that includes an AGC amplifier 48. The AGC loop serves to maintain an output pulse amplitude which is constant over a 60db dynamic range of the input signal. The purpose of the AGC action provided is to enable subsequent threshold comparison described below to consistently take place at the same leading edge point of the signal pulse relative to its peak magnitude. With this approach, the effects of pulse rise time can be largely eliminated with the respect to generating range error. This permits very short ranges to be measured, down to one or two feet.

The output of video amplifier is connected to one input of a video comparator 50. The second input to comparator 50 is a threshold reference terminal 52 the input of which is adjusted to avoid triggering of comparator 50 in response to noise. The video comparator 50 is connected to the "clear" input of a "range" bistable multivibrator or flip-flop 54 so that the output of the former "clears" the latter so as to set the "Q" output thereof low. Flip-flop 54 is preferably a fast Schottky-clamped TTL "D" flip-flop.

Synch pulses from the laser transmitter are received at synch input terminal 56 and, after a delay provided by a delay network 58 which compensates for internal receiver delays, are applied to the preset input flip-flop 54. Such a synch pulse is used to preset the flip-flop 54 so that the Q output is high prior to the receipt of the output signal from comparator 50.

The output signal produced by flip-flop 54 is a train of pulses whose widths are directly proportional to the transmit-receive round-trip propagation delay or range.

The output of flip-flop 54 is connected to a duty-cycle detector 60 which converts the constant amplitude, pulse repetition rate and variable width pulse signal into a d.c. analog voltage which is a linear function of range. A low pass filter 62 provides appropriate filtering of the output of detector 60.

A further delay network is connected between the output of delay network 58 and the "clock" input of flip-flop 54. If no signal is received which is of sufficient strength to exceed the comparator threshold reference signal at input terminal 52, flip-flop 54 is reset by a clock input pulse derived from a delayed sample of the synch pulse, and produced by delay network 64, so that a maximum output voltage is produced corresponding to a maximum range. In a specific embodiment, delay network 64 produces a 50 nanosecond delay corresponding to a maximum range of 25 feet. This "no-signal" reset delay limit establishes the maximum usable operational range of the system and is employed to prevent occasional signal pulse dropouts from excessively affecting the output of the duty cycle detector 60.

The clock input of the second D type bistable multivibrator or flip-flop 66 is also connected to the output of delay network 64 and the Q output of flip-flop 54 is connected to the D input. Flip-flop 66 is clocked in time coincidence with (or a few nanoseconds earlier than) the maximum range reset pulse to establish that a target signal is within the maximum range of the system. If the Q output of range flip-flop 54 is high at the instant of clocking flip-flop 66, the Q output of the latter will be high indicating that no video signal was received earlier and hence that no target was detected. However, if a target signal of sufficient strength had previously been received so as to set the Q output or range flip-flop 54 low, the Q output of flip-flop 66 would also be low indicating that a target was present within the maximum operational range.

Figure 3:
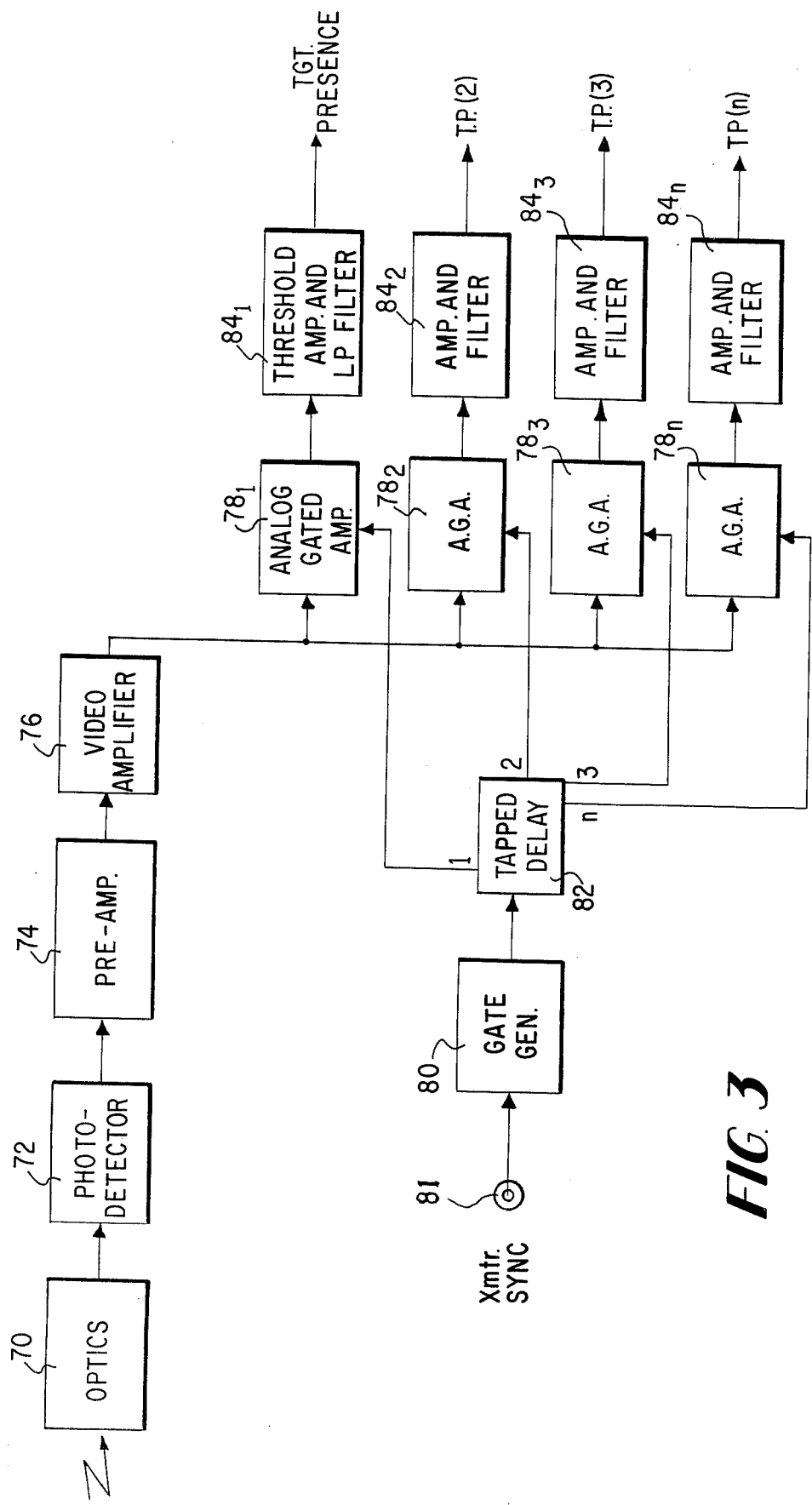
FIG. 3 is a block form circuit diagram of a zone detecting receiver in accordance with a further preferred embodiment of the invention.

Referring to FIG. 3, a block diagram of a zone detecting receiver is shown. In general, the zone detecting receiver responds to a target presence within a predetermined range corridor or zone established by a time gate in the receiver circuitry. As shown in FIG. 3, the zone detecting receiver includes suitable optics represented by block 70, a photo-detector 72, a preamplifier 74, and a video amplifier 76, all of which are similar in construction and function to the corresponding elements of the ranging receiver of FIG. 2. The amplified video output of video amplifier 76 is applied to each of a plurality of analog gated amplifiers or analog gates $78_1, 78_2, 78_3 \ldots 78_n$. Gated amplifiers $78_1$ to $78_n$ are driven by a gate generator 80 which is connected to a synch pulse terminal 81 so that generator 80 is suitably time referenced to the transmitter synch pulse. Generator 80 is connected through a tapped delay line 82 to gates $78_1$ to $78_n$. The gate width dictated by gate generator sets the size of the acceptable range cell or zone and, following the offset delay provided by tapped delay line 82, is used to actuate one or a number of gated amplifiers $78_1$ to $78_n$. The outputs of gated amplifiers $78_1$ to $78_n$ are filtered and thresholded for target presence as indicated by blocks $84_1$ to $84'n$.

By maintaining linear receiver performance on small signals (less than unity signal-to-noise ratio, S/N) before the gating operation, an improvement in the S/N voltage ratio after gating is achieved such that target presence can be detected for signals with peak received video amplitudes as small as 1/14th (−23db) of rms video noise. This particular improvement factor was provided by a model receiver detecting 15 nanosecond pulses at a 20 kHz pulse repetition rate and a 50 MHz video bandwidth, a 1Hz output bandwidth and a 45 nanosecond range gate width. For applications where the indication of the presence of a target or obstacle within a given range cell or zone is sufficient, as opposed to applications requiring a specific range measurement, the zone detection technique described herein above provides greater sensitivity than the range detecting technique. For example, models of the corresponding zone detecting and range detecting receiver types have threshold sensitivities of approximately 15 nanowatts and 1 microwatt, respectively.

It will be appreciated that the circuit components represented by the blocks shown in FIGS. 2 and 3 are conventional and can be chosen from commercially available components.

Although the invention has been described with reference to particular exemplary embodiments thereof, those skilled in the art will understand that variations and modifications in these embodiments may be effected without departing from the scope and spirit of the invention.

We claim:

1. A transmitter-receiver system comprising a laser diode transmitter and a range detecting receiver for receiving the output of said transmitter, said transmitter comprising a laser diode and a modulating circuit for said diode comprising a bank of avalanche transistors having a common output line, a capacitive storage network, means for sequentially triggering said transistors into the avalanche made so as to deliver energy from said storage network to said diode and means for directly connecting said common output line of said bank of transistors to said laser diode, and said receiver comprising signal converting means for converting the received transmitter output into an electrical input signal in accordance therewith; automatic gain control amplifier means connected to receive said input signal; comparator means for comparing the output of said amplifier means with a threshold reference; bistable multivibrator means which produces a predetermined output when the output of said amplifier means exceeds said threshold reference, said bistable multivibrator means being preset by a control signal derived from a transmitter synchronizing signal; and a duty-cycle detector connected to said bistable multivibrator means for converting the output thereof into a corresponding d-c range signal.

2. A transmitter-receiver system comprising a laser diode transmitter and a receiver for receiving the optical output of said transmitter and for producing an electrical output signal in accordance therewith, said transmitter comprising a laser diode and modulating means comprising capacitive storage means, a plurality of parallel-connected transistors having a common output line, means for sequentially triggering said transistors into their avalanche mode so that energy stored by said capacitive storage means is delivered to said laser diode and means for directly connecting said common output line of said plurality of transistors to said laser diode.

3. A transmitter-receiver system as claimed in claim 2 wherein said capacitive storage means is connected in a circuit which provides a low impedance external discharge path.

4. A transmitter-receiver system as claimed in claim 2 wherein said capacitive storage means is connected to a high voltage source through a fast recharge network.

5. A transmitter-receiver system as claimed in claim 2 wherein said triggering means comprises a modulator sequential driver circuit comprising a multivibrator, a binary counter connected to the output of said multivibrator, and a decoder connected to the output of said counter.

6. A transmitter-receiver system as claimed in claim 2 wherein said receiver comprises a ranging receiver for determining the distance to targets and for producing an output voltage in accordance therewith.

7. A transmitter-receiver system as claimed in claim 2 wherein said receiver comprises a zone detecting receiver which responds to the presence of a target within a predetermined zone, said receiver including timing gate whose open time determines the size of said zone.

* * * * *